No. 672,375. Patented Apr. 16, 1901.
J. M. JOYCE & W. H. FLARITY.
CULTIVATOR.
(Application filed Feb. 2, 1901.)
(No Model.) 2 Sheets—Sheet 1.
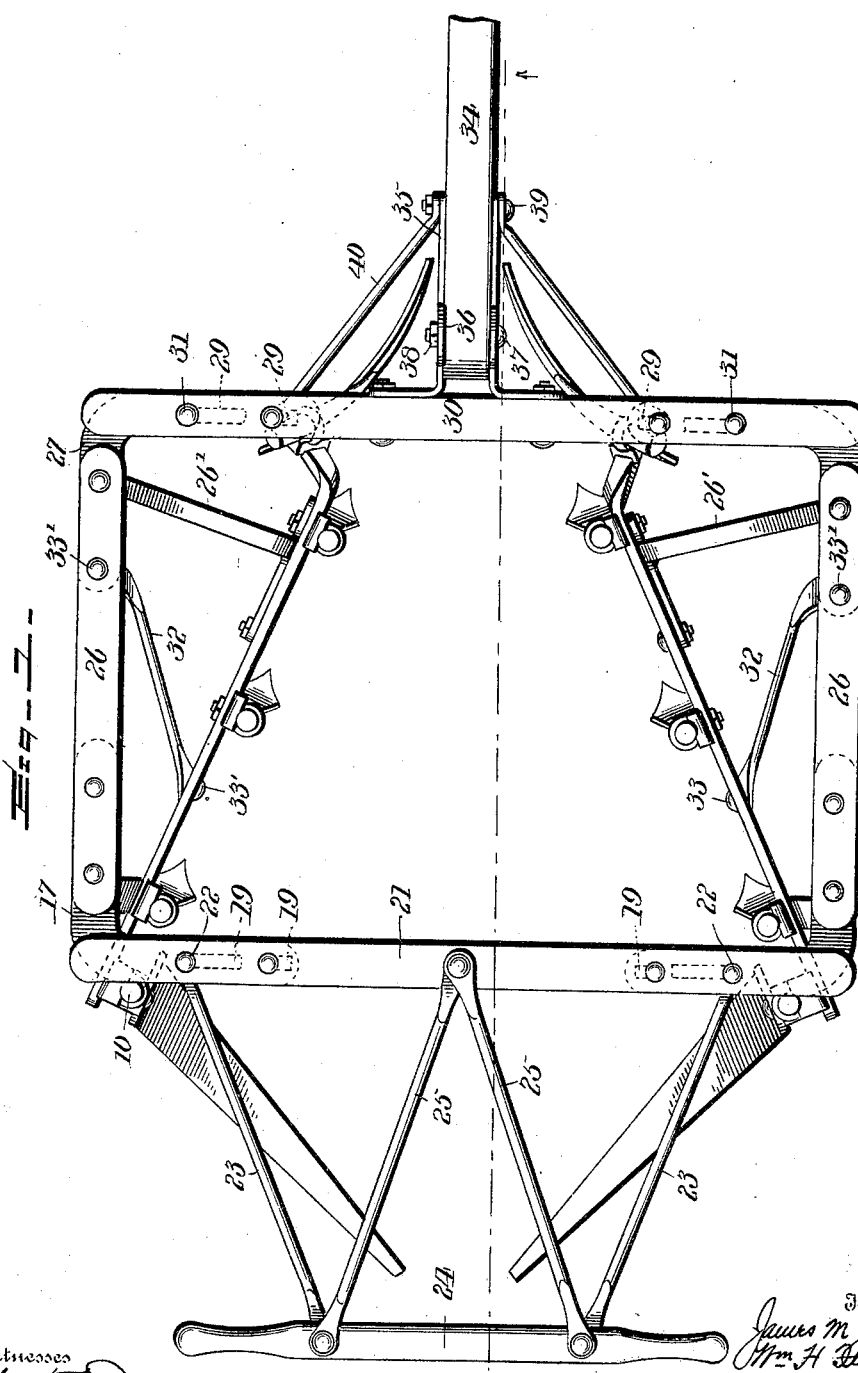
Witnesses
Wm F. Doyle
R. A. Ruess
Inventors
James M. Joyce
Wm H. Flarity
By H. Everitt
Attorneys

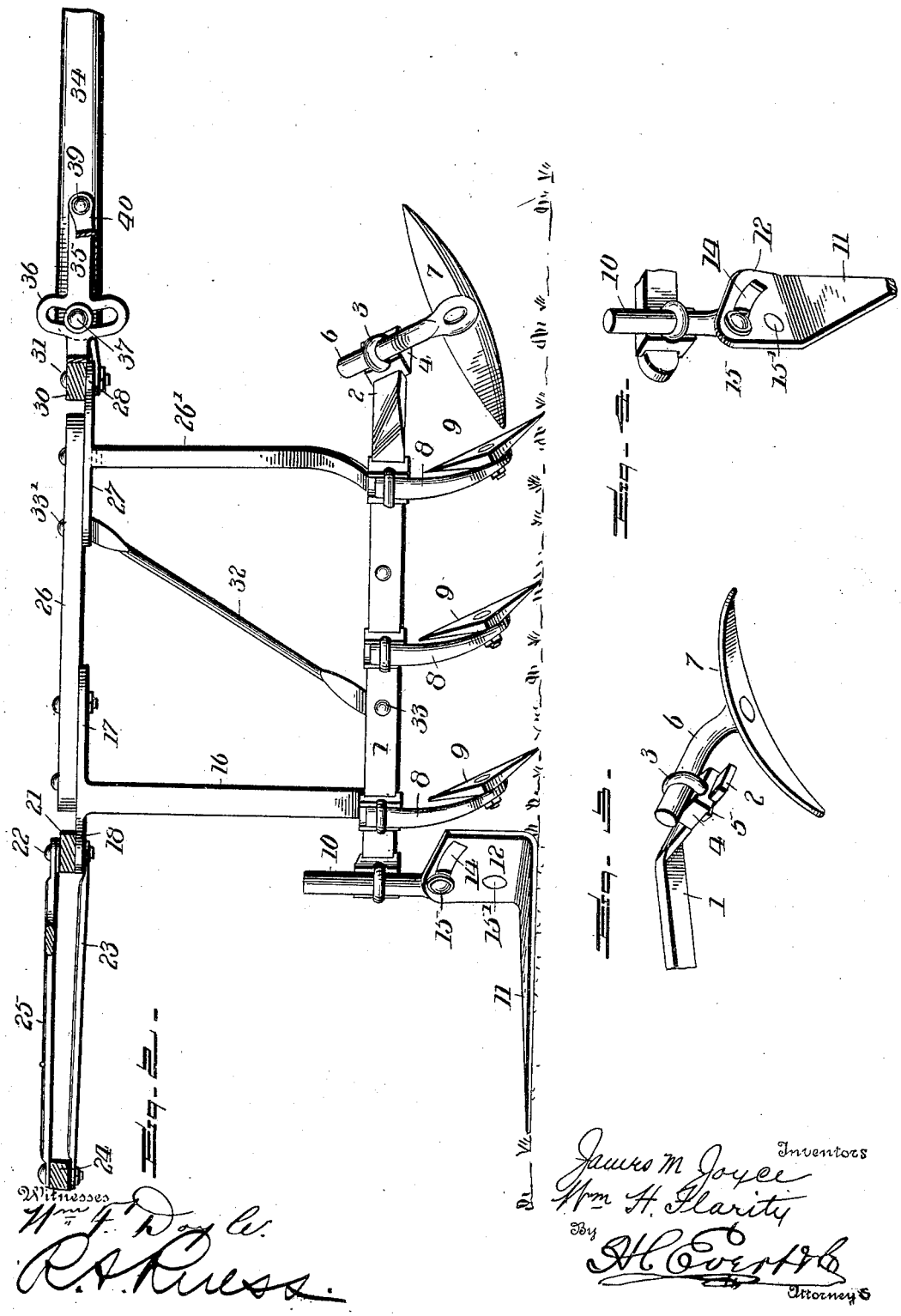

UNITED STATES PATENT OFFICE.

JAMES M. JOYCE AND WILLIAM H. FLARITY, OF EDGERTON, WISCONSIN.

CULTIVATOR.

SPECIFICATION forming part of Letters Patent No. 672,375, dated April 16, 1901.

Application filed February 2, 1901. Serial No. 45,699. (No model.)

*To all whom it may concern:*

Be it known that we, JAMES M. JOYCE and WILLIAM H. FLARITY, citizens of the United States of America, residing at Edgerton, in the county of Rock and State of Wisconsin, have invented certain new and useful Improvements in Cultivators, of which the following is a specification, reference being had therein to the accompanying drawings.

This invention relates to certain new and useful improvements in a combined weeder, cultivator, and root-cutter; and it consists in the novel combination and arrangement of parts hereinafter more specifically described, illustrated in the accompanying drawings, and particularly pointed out in the claims hereunto appended.

In the accompanying drawings, Figure 1 is a top plan view of our improved weeder, cultivator, and root-cutter. Fig. 2 is a vertical longitudinal sectional view of the same. Fig. 3 is a detail perspective view of one of the weeding-blades. Fig. 4 is a like view of one of the root-cutting blades, partly broken away.

Our invention comprises in its construction a pair of curved knives or weeding-blades which are adjustable and which are supported from the cultivator frame-arms, one on each side of the row being worked, a series of adjustable hoes or shovel-blades, and a pair of rear knives or cutters, which latter are also adjustable and which are adapted to cut the roots of the weeds, as well as level the ground and hill the plants.

To put our invention into practice, we provide two cultivator frame-bars 1, which are placed at an angle to a central longitudinal line through the cultivator, their forward ends being bent outwardly, as at 2. These outwardly-extending forward ends of the bars 1 are provided with apertures to receive an eyebolt 3, which passes through a bearing-block 4, mounted on the end 2 of the bars and held by providing the under face of the block with a groove or recess to receive the bar, as shown in Fig. 3. The eyebolt 3 is held by a nut 5, and the eye of this bolt receives the shank or stem 6, which has rigidly secured, as by riveting, the curved weeding-blade 7. The upper face of the bearing-block, against which the stem or shank is tightened, is preferable recessed to receive this stem or shank, so that when the nut 5 is tightened the stem or shank will be firmly held between the eyebolt and the bearing-block. These bearing-blocks, in connection with the eyebolts, therefore form a clamp for holding the stems or shanks, and a series of such clamps as that just described is attached to the frame-bars 1 throughout their length, and held between the eyebolt and the bearing-block of each of these clamps are the shanks 8 of the hoes or shovels 9. These hoes or shovels may be rigidly connected to the stems or shanks, since the latter are adjustable in their clamps, thus permitting the adjustment of the hoes or shovels.

To the inner face of each of the frame-bars, at the rear end thereof, is attached one of the clamps described, and in this clamp is secured the shank or stem 10 of the cutting-blades 11. These cutting-blades extend rearwardly, with their free ends converging toward each other and their inner ends turned upwardly at right angles to the body portion of the blade, as shown at 12. This upwardly-extending portion of the blade is provided with a curved slot 14 to receive a screw-bolt 15, passing through the stem or shank 10 and held by a suitable nut. Below this connection of the blade with the stem or shank the same is pivoted thereto, as at 15'. It will thus be observed that these blades, besides being adjustable vertically by adjusting the stems in their clamps, are adjustable irrespective of their stems or shanks by loosening the screw-bolt 15 and moving the blade upon its pivot-point, as may be permitted by the length of the slot 14, so as to have the body portion of the said blades lie flat upon the ground or set at an angle thereto, as may be desired, according to the function it is desired for the blades to perform.

In use the device straddles the row of plants being cultivated, so that one of the weeding-blades, one frame-bar and its hoes or shovels, and one of the cutting-blades at the rear of the cultivator are on one side of the row and the other set on the opposite side. It is therefore necessary to connect the bars together at a height which will not interfere with the plants. We therefore provide a skeleton frame comprising front and rear cross-bars, together with supporting-standards therefor, which we will now describe.

The rear standards 16 are held by the eyebolts that fasten the rear set of shovels or hoes to the frame-bars 1, and these rear standards 16 are provided at their upper ends with arms 17 18, the former extending forwardly of the cultivator and the latter transversely thereto. These transversely-extending arms 18 are provided with elongated slots 19 to permit adjustment of the cultivator, as will be later described. Connected to the arms 18 by bolts 20 is the rear cross-bar of the skeleton frame, this cross-bar 21 having connected to its underneath face by means of bolts 22 braces 23, the rear ends of which are attached to the handle 24. This handle is also braced by braces 25, connected at their rear ends to the upper face of the handle by the same bolts that fasten the rear ends of the braces 23 thereto, said braces 25 at their forward ends being held by the bolts 22 that fasten the rear cross-bar to the arms 18. The arms 19 have bolted thereto the rear ends of the side bars 26, and as it is only necessary to provide transverse adjustment for the cultivator these side bars are not adjustably connected to the arms of the standards. Near the forward ends of the frame-bars 1 is the front supporting-standards for the skeleton upper frame. These standards at their lower ends are substantially L-shaped, the one arm thereof being apertured to receive the eyebolt that holds the stem of one of the shovels and the other arm being bolted to the frame-bar 1. These standards are curved outwardly just above the point of fastening their lower ends, so that the vertical portion 26' thereof will be in about the same line as the rear standards. At their upper ends these front standards are also provided with rearwardly-extending arms 27 and transversely-extending arms 28, the latter being slotted, as at 29. To the rearwardly-extending arms 27 is attached the forward ends of the side bars 26, and to the transversely-extending arms 28 is attached the front cross-bar 30. The bolts 31, which secure this front cross-bar in position, extend through the slots 29, so as to provide for the transverse adjustment of the cultivator.

In order to give strength and rigidity to the device, we may employ supplemental braces 32, the lower ends of which are attached to to the frame-bars 1 by bolts or screws 33, and the upper ends of which are connected to the arms 27 and side bars 26 by means of bolts 33'.

The tongue 34 is connected to the front cross-bar of the skeleton frame, and to provide for adjustment of this tongue we provide the straps 35, between which the rear end of the tongue is secured with links 36 to receive a bolt 37, carried by the tongue and fastened by nut 38. The tongue is also secured in these straps by a bolt 39 passing through the tongue and the straps at the forward ends of the latter, there being also connected to this bolt the forward ends of braces 40, the rear ends of which are held by the bolts passing through the front cross-bar and through the slots in the arms 28. The ends of the straps between which the tongue is secured are firmly bolted to the front cross-bar of the skeleton frame and by loosening the nut on the bolt 37 it will be observed that the bolt 39 acts as the pivot or fulcrum point upon which the tongue is moved to elevate or lower the outer or forward end thereof. When the bolts which fasten the front cross-bar and the rear cross-bar to the slotted arms of the standards are loosened, it will be observed that the side bars and the frame-bars, with the cultivating mechanism carried by the latter, may be moved laterally, so as to bring the weeding-blades, hoes or shovels, and cutting-blades closer toward or apart from each other, as may be desired, according to the particular function desired to be performed. The cultivating parts may all be adjusted so as to give a greater or less depth of the same in the earth, as will be readily apparent, and it will be noted that in the construction, various changes may be made in the details without departing from the general spirit of the invention.

Having fully described our invention, what we claim as new, and desire to secure by Letters Patent, is—

1. In a cultivator, a pair of frame-bars, an adjustable weeding-blade carried by the front end of each of said bars, adjustable cutting-blades carried by the rear ends thereof, a series of adjustable shovels carried by the bars, uprights or standards connected to said bars, and a skeleton frame carried by said standards and connecting the frame-bars together, substantially as described.

2. In a cultivator, a pair of frame-bars, an adjustable weeding-blade carried by each bar at its forward end, a series of adjustable shovels carried by said bars, and an adjustable skeleton frame supported by standards above the bars and connecting the same together.

3. In cultivators, a pair of frame-bars, a series of clamps connected thereto, adjustable weeding-blades carried by the clamps at the forward ends of the bars, adjustable cutting-blades carried by the clamps at the rear ends of the bars, and a series of shovels carried by the clamps intermediate the ends of the bars, combined with standards connected to said bars, and a skeleton frame supported by said standards and adjustably connected thereto.

4. In cultivators, the combination with adjustable weeding-blades, adjustable shovels, and adjustable cutting-blades, of standards connected to the frame-bars carrying the shovels, weeding-blades and cutting-blades, and a frame supported on the upper ends of said standards and adjustably connected thereto.

In testimony whereof we affix our signatures in the presence of two witnesses.

JAMES M. JOYCE.
WILLIAM H. FLARITY.

Witnesses:
J. L. HOLTON,
E. M. LADD.